United States Patent [19]
McKee

[11] Patent Number: 5,492,068
[45] Date of Patent: Feb. 20, 1996

[54] DESK SYSTEM FOR VAN TYPE VEHICLES

[76] Inventor: Carl B. McKee, 29971 Homedale, New Hudson, Mich. 48165

[21] Appl. No.: 217,159

[22] Filed: Mar. 24, 1994

[51] Int. Cl.$^6$ .................................................. A47B 23/00
[52] U.S. Cl. ............................ 108/44; 297/135; 297/232; 296/37.8
[58] Field of Search ......................... 108/45, 44; 297/194, 297/135, 232; 296/37.8; 224/42.42, 273, 277

[56] References Cited

U.S. PATENT DOCUMENTS

| | | |
|---|---|---|
| 2,934,391 | 4/1960 | Bohnett . |
| 3,336,077 | 8/1967 | Radke et al. ...................... 297/232 X |
| 3,356,409 | 12/1967 | Belsky et al. ...................... 224/275 X |
| 3,589,577 | 6/1971 | Basinger . |
| 3,750,597 | 8/1973 | Muns ...................... 108/45 |
| 3,909,092 | 9/1975 | Kiernan . |
| 4,371,138 | 2/1983 | Roberts . |
| 4,417,764 | 11/1983 | Marcus et al. . |
| 4,453,759 | 6/1984 | Kathiria ...................... 108/44 X |
| 4,809,897 | 3/1989 | Wright, Jr. ...................... 224/282 |
| 4,818,008 | 4/1989 | Cressoni ...................... 224/42.42 X |
| 4,878,438 | 11/1989 | Carver ...................... 108/44 |
| 4,998,770 | 3/1991 | Shimizu et al. ...................... 224/42.42 X |
| 5,071,049 | 12/1991 | Mozer . |
| 5,085,153 | 2/1992 | McKee . |
| 5,187,744 | 2/1993 | Richter ...................... 224/42.42 X |
| 5,390,609 | 2/1995 | McKee ...................... 108/45 |

FOREIGN PATENT DOCUMENTS

| | | | |
|---|---|---|---|
| 2549786 | 2/1985 | France ...................... | 224/273 |
| 2818035 | 11/1979 | Germany . | |
| 4019247 | 1/1992 | Japan ...................... | 224/275 |
| 1384440 | 2/1975 | United Kingdom . | |

OTHER PUBLICATIONS

Auto Vision, Inc., *The Sideshow entertainment console,* 1994, 4 pages, U.S.A.

Primary Examiner—Peter M. Cuomo
Assistant Examiner—Janet Wilkens
Attorney, Agent, or Firm—Howard & Howard

[57] ABSTRACT

A desk system for use in a van type vehicle includes a pedestal having a floor engaging base and an upper mounting surface for releasably retaining a portable desk structure. The pedestal has a pair of fingers for contacting a front corner of each of a pair of spaced apart seat risers, a pair of adjusting screws for contacting sides of each of the seat risers and a pair of clamps for contacting a rear corner of each of the seat risers. An upwardly extending wall formed about a periphery of the upper mounting surface, a pair of depressions are formed in a lower surface of the portable desk structure and a pair of posts are formed in the upper mounting surface to retain the portable desk structure on the pedestal. The pedestal can have storage compartments formed therein.

17 Claims, 3 Drawing Sheets

5,492,068

DESK SYSTEM FOR VAN TYPE VEHICLES

BACKGROUND OF THE INVENTION

The present invention relates generally to desk structures for use in vehicles and, in particular, to a desk system for mounting a desk structure in van type vehicles.

Many devices are known for providing a driver and/or passenger in a vehicle access to various objects such as a note pad, a drink container, a cellular telephone, business files, etc. Generally, these devices are mounted either on the dashboard of the vehicle, upon the front seat of the vehicle, or straddling the transmission/drive shaft hump in the front floor of the vehicle. For example, there is shown in the U.S. Pat. No. 2,934,391 an automobile desk that is supported at a forward end on the floor of a vehicle by a pair of adjustable length legs and at a rearward end on the bench seat cushion. The U.S. Pat. No. 3,909,092 shows an integrally molded one-piece portable console with a back portion that rests on the automobile seat and a depending front portion that extends downwardly over the front of the seat and rests on the drive shaft tunnel of the automobile. The U.S. Pat. No. 4,417,764 shows an armrest for a vehicle including a drawer having a holder for different types and sizes of beverage containers and a slide with recesses for holding a writing instrument and writing media. The U.S. Pat. No. 5,071,049 shows a mobile telephone console for mounting on the transmission hump of a vehicle and including a writing table extending on an arm from the side from the console body. The U.S. Pat. No. 5,085,153 shows a desk structure for removable mounting on a front arm rest of a vehicle.

Each of the above discussed devices is not particularly suited for use in a van-type vehicle having a pair of spaced apart "captain's chairs" for the driver and a front seat passenger. Such a vehicle does not have the bench-type seat needed to support several of the prior art devices and, in a front wheel drive van, there is no transmission/drive shaft tunnel to support otheres ones of the prior art devices.

SUMMARY OF THE INVENTION

The present invention concerns a desk system for use in a van type vehicle between a pair of vehicle seats. The desk structure includes a pedestal means having a floor engaging base and an upper mounting surface, a first mounting means attached to the pedestal means for releasably engaging a pair of spaced apart seat risers mounted on a vehicle floor when the pedestal means is positioned between the seat risers, a portable desk structure having a lower surface and a second mounting means having a first mounting portion attached to the upper mounting surface of the pedestal means and a second mounting portion attached to the lower surface of the portable desk structure, the first mounting portion and the second mounting portion cooperating to releasably retain the portable desk structure on the upper mounting surface of the pedestal means.

The pedestal means can include a pedestal base having a floor engaging base plate and extending upwardly to an upper surface, a pedestal desk support having a lower surface and extending upwardly to the upper mounting surface, and means for retaining the pedestal desk support on the upper surface of the pedestal base. The means for retaining can include an upwardly extending wall formed about a periphery of the upper surface of the pedestal base for retaining the lower surface of the pedestal desk support on the upper surface of the pedestal base. The means for retaining also can includes at least one depression formed in one of the upper surface of the pedestal base and the lower surface of the pedestal desk support and at least one post formed in the other one of the upper surface of the pedestal base and the lower surface of the pedestal desk support, the post cooperating with the depression for retaining the lower surface of the pedestal desk support on the upper surface of the pedestal base. The depression and the post each have an aperture formed therein and a fastener means extending through the apertures for securely retaining the pedestal desk support on the pedestal base. The pedestal means also can have at least one storage compartment formed therein.

The first mounting means includes at least one finger extending from the floor engaging base for contacting a front corner of one of the seat risers, at least one adjusting screw extending from the floor engaging base for contacting a side of one of the seat risers and at least one clamp attached to the floor engaging base for contacting a rear corner of one of the seat risers. In an alternate embodiment, the adjusting screw and the clamp are replaced by at least one aperture formed in the floor engaging base and a fastener extending through the aperture for threadably engaging the vehicle floor.

The second mounting means includes an upwardly extending wall formed about a periphery of the upper mounting surface of the pedestal means, at least one of a depression and a post formed in the upper mounting surface of the pedestal means and at least one of the other one of a depression and a post formed in a lower surface of the portable desk structure, the wall, the post and the depression cooperating to retain the portable desk structure on the upper mounting surface of the pedestal means. The depression and the post each have an aperture formed therein and fastener means extending through the apertures for securely retaining the portable desk structure on the pedestal means.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
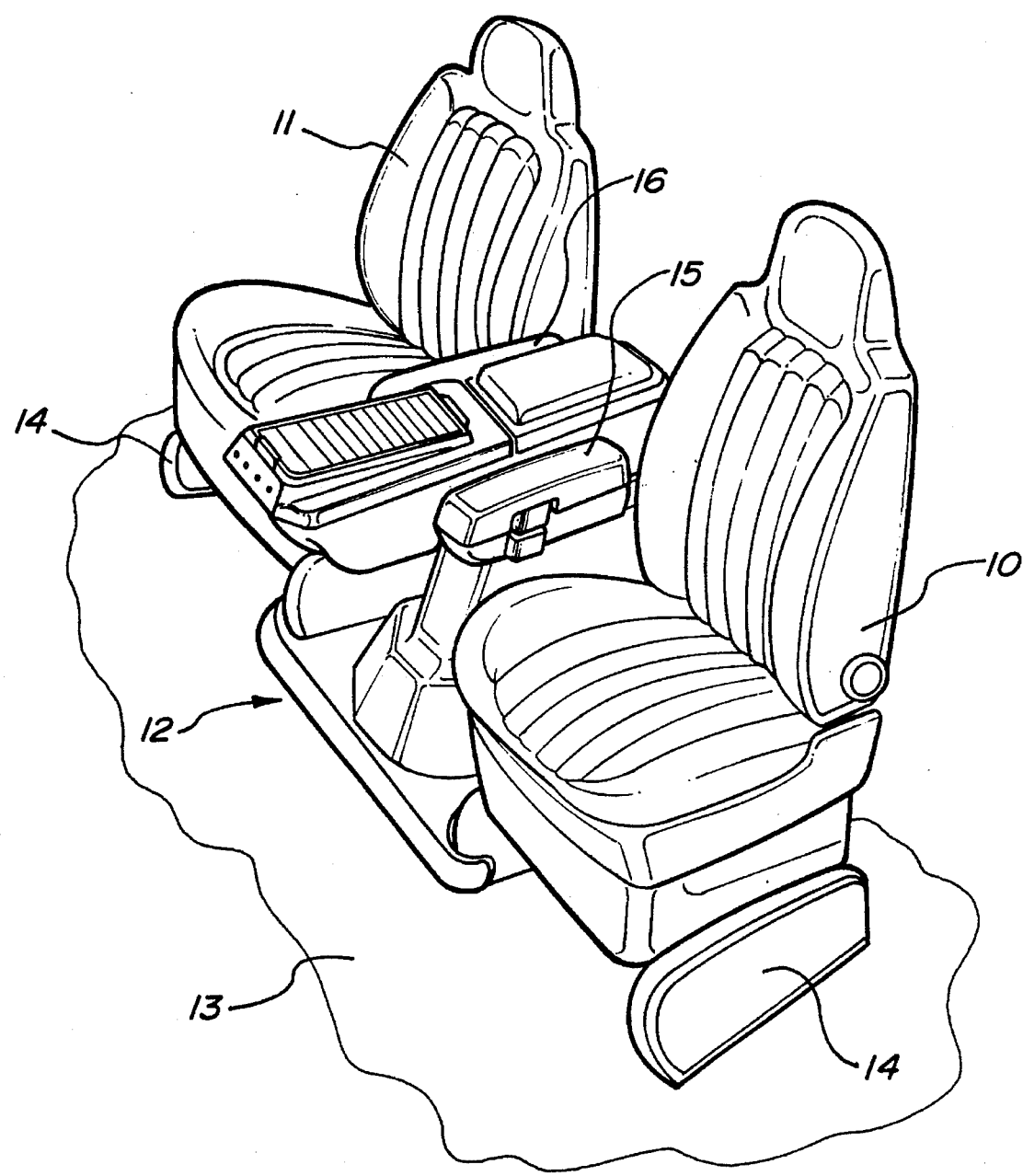
FIG.1 is a fragmentary perspective view of a front seat area of a van type vehicle including a desk system according to the present invention.

There is shown in the FIG. 1 a portion of an interior of a van type vehicle including a driver's seat 10 and a passenger's seat 11 with a desk system 12 according to the present invention positioned therebetween. The seats 10 and 11 are mounted side-by-side in a spaced apart relationship on a generally flat floor 13 of the vehicle. Typically, the seats 10 and 11 are each mounted on a separate one of a pair of seat risers 14 which are fixedly attached to the floor 13 of the vehicle. The seats 10 and 11 are of the type commonly known as "captain's chairs". Thus, the driver's seat 10 includes an armrest 15 mounted thereon on the side toward the passenger's seat 11 and the passenger's seat includes an armrest 16 mounted thereon on the side toward the driver's seat. The desk structure 12 includes a pedestal base 17 which rests on the vehicle floor 13 and is attached to the seat risers 14 as described below. Extending upwardly from the pedestal base 17 is a pedestal desk support 18 having means for retaining a desk structure 19 between the armrests 15 and 16.

Figure 2:
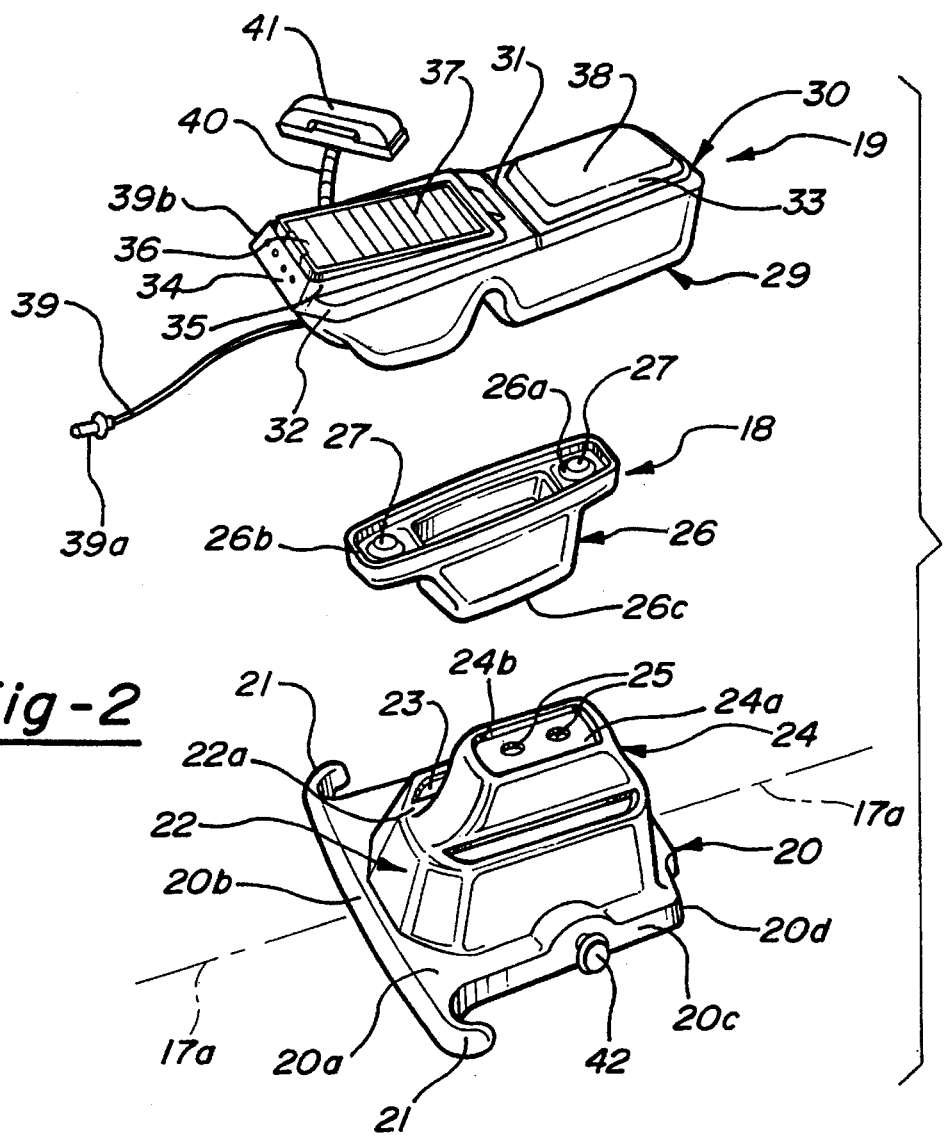
FIG. 2 is an exploded perspective view of the desk system shown in the FIG. 1.

As shown in the FIG. 2, the pedestal desk support 18 is mounted on top of the pedestal base 17 and supports the desk structure 19. The pedestal base 17 and the pedestal desk support 18 can be formed of a thermoformed plastic material. Although the pedestal base 17 and the pedestal desk support 18 are shown as separate structures, they could be formed as a single, unitary structure. The pedestal base 17 has a longitudinal axis 17a which is generally parallel to the longitudinal axis of the vehicle in which it is mounted. The pedestal base 17 tapers upwardly and inwardly in three steps or sections. The pedestal base 17 has a lower or bottom section which is a generally planar, horizontally extending floor engaging base plate 20 having an upper surface 20a. A pair of fingers 21 are provided on the base plate 20 and extend transversely to the longitudinal axis 17a from opposite sides of a generally vertically extending front wall 20b of the base plate for contacting a front corner of the seat risers 14 as will be discussed below. An intermediate section 22 of the pedestal base 17 extends upwardly from the upper surface 20a and terminates in an upper surface 22a. The intermediate section 22 has a base that is smaller than the upper surface 20a of the base plate 20 and tapers inwardly and upwardly to the generally horizontally extending upper surface 22a. A pair of generally longitudinally extending storage compartments 23 can be formed in the upper surface 22a along side edges of the intermediate section 22 for retaining such items as maps. An upper section 24 of the pedestal base 17 is positioned between the storage compartments 23. The upper section 24 has a base that is smaller that the upper surface 22a and tapers inwardly and upwardly to a generally horizontally extending upper surface 24a. Formed in the upper surface 24a are a pair of apertured depressions 25 spaced apart along the longitudinal axis 17a of the pedestal base 17 for mounting the pedestal desk support 18 as discussed below.

The pedestal desk support 18 includes a body 26 having a generally horizontally extending upper surface 26a attached along a periphery thereof to an upwardly extending surrounding lip or wall 26b. The body 26 tapers inwardly and downwardly to a lower surface 26c which abuts the upper surface 24a of the upper section 24. Formed on the upper surface 26a are a pair of upwardly extending upper posts 27 spaced apart along the longitudinal axis 17a of the pedestal base 17 for engaging the desk structure 19 as discussed below.

The desk structure 19 includes a tub-like base or body portion 29 integral with a plate-like top portion 30 conforming generally to the outline of the generally rectangular and substantially hollow base portion 29. The body portion 29 and the top portion 30 can be formed of a suitable material such as a thermoformed plastic material. The top portion 30 is transversely divided, as at a split 31, to provide a pair of cover members shown as a front cover member 32 and a rear cover member 33. The front cover member 32 may be attached at a front edge thereof by a hinge 34 to the body portion 29. The front cover member 32 can be formed with a raised portion 35 which has a clip means 36 secured thereto for receiving and retaining a writing tablet 37. The raised portion 35 may be inclined upwardly from rear to front to facilitate use of the tablet 37. The rear cover member 33 preferably mounts thereon a cushion means 38 for resting a person's forearm. This provides comfort to the driver while writing on the tablet 37, and at other times when utilizing the desk structure 19.

The desk structure 19 can be provided with a wide variety of business tools and is intended to be used only while the vehicle is in the parked position. The desk structure 19 is pre-wired with an electrical power cable 39 including a fuse tipped plug 39a for inserting into an electrical receptacle such as the one typically provided in the vehicle ashtray receiver to provide power. The cable 39 terminates in a pair of receptacles 39b on the upper surface of the desk structure 19 and also leads to a mobile telephone transceiver connector (not shown) mounted in the body portion 29. The desk structure 19 includes the raised portion writing surface 35 for retaining the writing tablet or pad 37, a mounting arm 40 for a cellular phone 41, and a pre-drilled antenna mounting aperture (not shown). The desk structure 19 also can mount such data gathering items as a facsimile machines, a lap top computer, a pen point system, a calculator, a printer, an electronic organizer, a pager and other types of hi-tech communication devices either inside the body portion 29, or in cavities molded into the cover members 32 and 33, or on an arm such as the mounting arm 40. These items can receive electrical power by plugging them into the receptacles 39b. Mating mounting surfaces on the bottom of the desk structure 19 and the top of the pedestal desk support 18 do not require assembly and the desk structure can be quickly removed from the pedestal desk support for use or storage inside or outside the vehicle as is discussed below.

Figure 3:
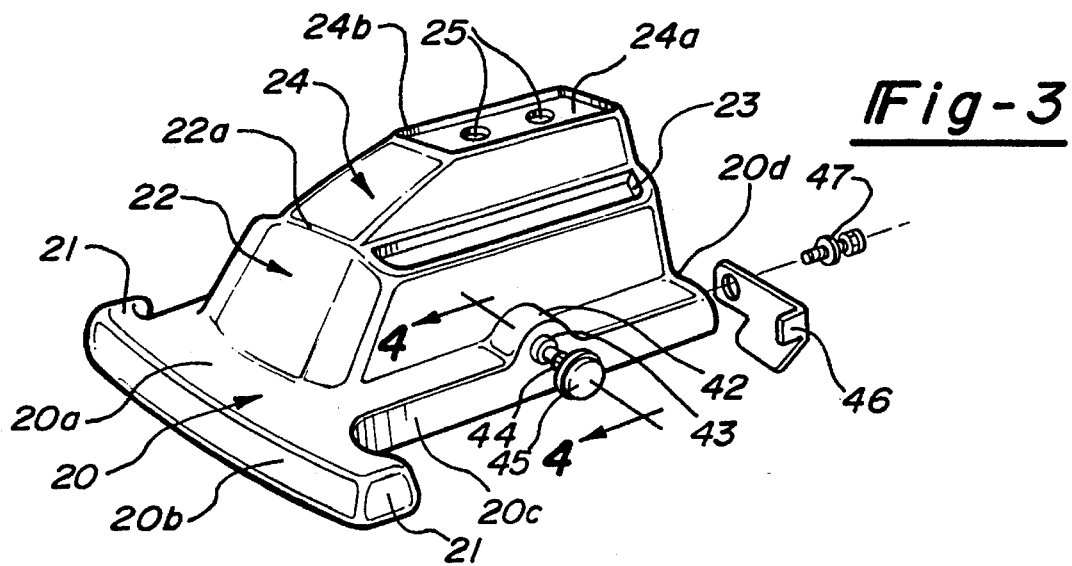
FIG. 3 is an enlarged perspective view of the pedestal base shown in the FIG. 2.
Figure 4:
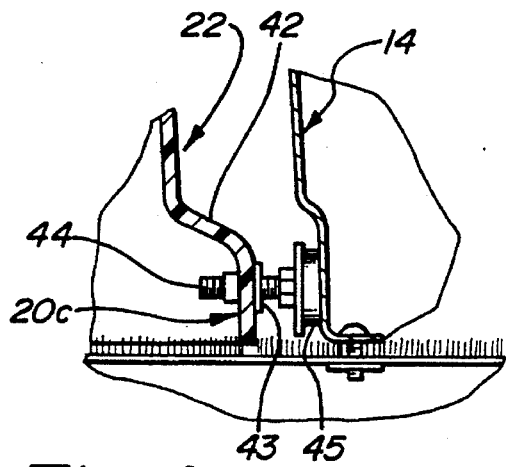
FIG. 4 is an enlarged fragmentary cross-sectional view of a portion of the pedestal base shown in the FIG. 3.
Figure 5:
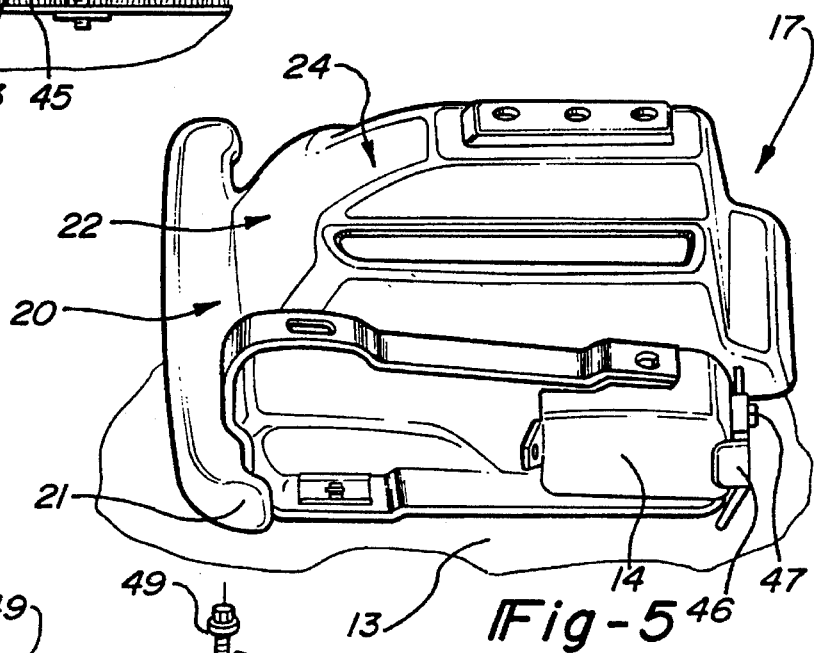
FIG. 5 is a perspective view of the pedestal base shown in the FIG. 3 secured to a sear riser.

The FIGS. 3–5 show the pedestal base 17 and means for securing the pedestal base between the seats in the vehicle. As shown in the FIG. 3, the base plate 20 includes a generally vertically extending side wall 20c. The upper surface 20a has a raised portion 42 formed therein approximately midway between the front wall 20b and a rear wail 20d of the base plate 20. The raised portion 42 extends from the side wall 20c to join the intermediate section 22. An internally threaded insert 43 is mounted in the side wall 20c at the raised portion 42 and receives a threaded shank of an adjusting screw 44. A head of the adjusting screw 44 has a disk or pad 45 attached thereto which can be formed of a suitable material such as a non-skid hard rubber material. As shown in the FIG. 5, the pedestal base 17 is inserted between the seats from the front side thereof and moved backward until the fingers 21 abut the forwardly facing surfaces of the corresponding seat risers 14. Referring to the FIG. 4, the adjusting screw 44 is rotated in a direction to move the pad 45 into engagement with the facing sidewall of the seat riser 14 for the driver's seat 10. The raised portion 42, the insert 43, the adjusting screw 44 and the disk 45 are duplicated on the opposite side of the pedestal base 17 for engaging the seat riser 14 for the passenger's seat 11. Referring to the FIG. 5, the pedestal base 17 can now be firmly secured between the seats utilizing a pair of clamps 46 and threaded fasteners 47. The clamp 46 is shaped to engage a rear corner of the seat riser 14. The clamp 46 is attached to the rear wall 20d of the bottom or base plate 20 by a threaded fastener 47.

Figure 6:
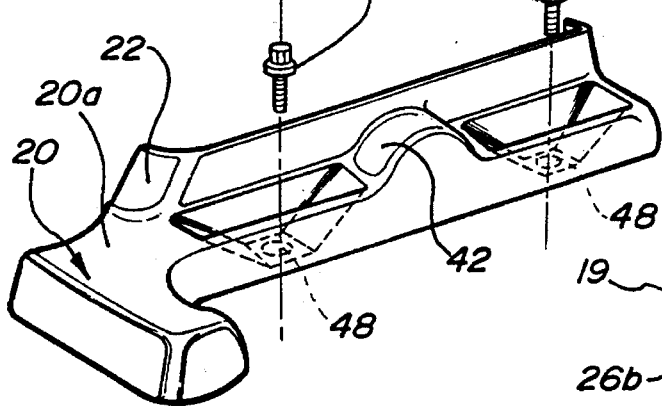
FIG. 6 is a fragmentary perspective view of a portion of an alternate embodiment pedestal base.

There is shown in the FIG. 6 an alternate embodiment of the mounting means for the pedestal base 17. A pair of apertured depressions 48 are formed in the upper surface 20a on opposite sides of the raised portion 42. A pair of threaded fasteners 49 are inserted into respective ones of the apertures formed in the depressions 48 and threadably engage apertures (not shown) formed in the vehicle floor 13. With this alternate mounting means, the insert 43, the adjusting screw 44, the disk 45, the clamp 46 and the threaded fastener 47 are not required.

Figure 7:
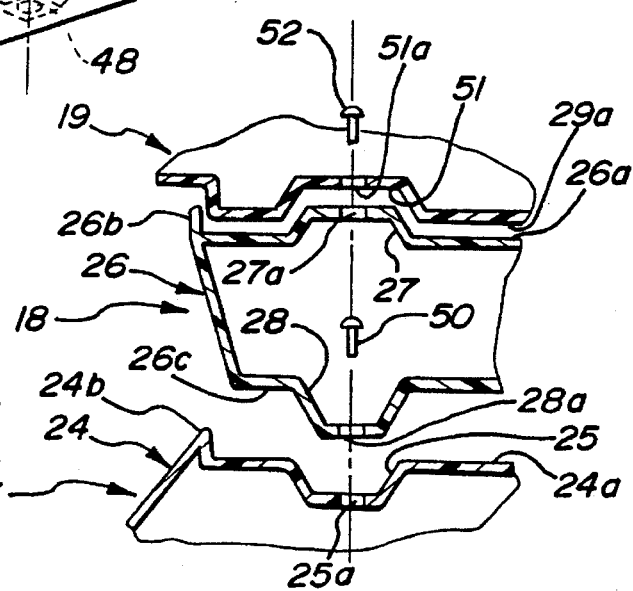
FIG. 7 is an enlarged fragmentary cross-sectional view of the center portion of the desk structure shown in the FIG. 1.

There is shown in the FIG. 7 a mounting system for attaching the pedestal desk support 18 to the top of the pedestal base 17 and for attaching the desk structure 19 to the top of the pedestal desk support. The lower surface 26c of the body 26 is shaped and sized to conform to the upper surface 24a of the upper section 24 and be received within the lip or wall 24b. Each of the depressions 25 formed in the upper surface 24a has an aperture 25a formed therein. A pair of lower posts 28, only one of which is shown, are formed on and extend downwardly from the lower surface 26c to each mate with a corresponding one of the apertured depressions 25. There is formed in each of the lower posts 28 an aperture 28a. The apertures 25a and 28a are aligned when the posts 28 are mated with the depressions 25 and can accept a suitable fastener such as a rivet 50 for securely fastening the pedestal desk support 18 to the top of the pedestal base 17. Of course, the depressions 25 could be formed in the lower surface 26c and the posts 28 could be formed in the upper surface 24a.

The body portion 29 has a lower surface 29a shaped and sized to conform to the upper surface 26a of the body 26 and be received within the lip or wall 26b. A pair of depressions 51, only one of which is shown, are formed in the lower surface 29a for mating with the upper posts 27 formed on the pedestal desk support 18. The posts 27 and the depressions 51 and the lower surface 29a and the wall 26b cooperate to retain the desk structure 19 on the upper surface 26a of the pedestal desk support 18. However, the desk structure 19 remains free to be removed from the pedestal desk support 18 for use somewhere else in the van or even outside of the van. If it desired to retain the desk structure 19 on the pedestal desk support 18 in a more secure manner, each of the upper posts 27 can have an aperture 27a formed therein and each of the depressions 51 can have a corresponding aperture 51a formed therein. The apertures 27a and 51a can accept a suitable fastener such as a rivet 52 for securely fastening the desk structure 19 to the top of the pedestal desk support 18. Of course, the depressions 51 could be formed in the upper surface 26a and the posts 27 could be formed in the lower surface 29a.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A desk system for use in a van type vehicle having a pair of side-by-side spaced apart vehicle seats mounted upon seat risers attached to a floor of the vehicle comprising:

a pedestal means having a floor engaging base and tapering inwardly and upwardly to an upper mounting surface;

a first mounting means attached to said pedestal means for releasably engaging a pair of spaced apart seat risers mounted on a vehicle floor when said pedestal means is positioned between the seat risers;

a portable desk structure having means for mounting a cellular telephone; and a second mounting means attached to said upper mounting surface of said pedestal means and to said portable desk structure for releasably retaining said portable desk structure on said upper mounting surface of said pedestal means whereby when the desk system is mounted in a vehicle with said base engaging a floor of the vehicle between a pair of side-by-side spaced apart seats mounted on seat risers and said first mounting means releasably engages the seat risers, said portable desk structure can be removed from the vehicle without removing said pedestal means by releasing said second mounting means from retaining said portable desk structure on said upper mounting surface and said pedestal means and said portable desk structure can be removed from the vehicle as an assembly by releasing said first mounting means from engagement with the seat risers.

2. The desk system according to claim 1 including a pair of fingers extending from said floor engaging base for contacting a front corner of each of the seat risers, and wherein said first mounting means includes a pair of adjusting screws extending from said floor engaging base for contacting each of the seat risers and a pair of clamps attached to said floor engaging base for contacting a rear corner of each of the seat risers.

3. A desk system for use in a van type vehicle having a pair of side-by-side spaced apart vehicle seats mounted upon seat risers attached to a floor of the vehicle comprising:

a pedestal means having a floor engaging base and an upper mounting surface;

a mounting means attached to said pedestal means for releasably engaging a pair of spaced apart seat risers mounted on a vehicle floor and preventing relative movement between said pedestal means and the seat risers in at least one direction when said pedestal means is positioned between the seat risers; and a portable desk structure having a lower surface, a writing surface and means for mounting a cellular telephone, said lower surface being releasably attached to said upper mounting surface whereby when the desk system is mounted in a vehicle with said base engaging a floor of the vehicle between a pair of side-by-side spaced apart seats mounted on seat risers and said mounting means releasably engages the seat risers, said portable desk structure can be removed from the vehicle without removing said pedestal means by releasing said lower surface from said upper mounting surface and said pedestal means and said portable desk structure can be removed from the vehicle as an assembly by releasing said mounting means from engagement with the seat risers.

4. The desk system according to claim 1 wherein said pedestal means has at least one storage compartment formed therein.

5. The desk system according to claim 3 wherein said pedestal means includes a pedestal base having a floor engaging base plate extending upwardly to an upper surface, a pedestal desk support having a lower surface extending upwardly to said upper mounting surface, and means for retaining said pedestal desk support on said upper surface of said pedestal base.

6. The desk system according to claim 5 wherein said means for retaining includes an upwardly extending wall formed about a periphery of said upper surface of said pedestal base for retaining said lower surface of said pedestal desk support on said upper surface of said pedestal base.

7. The desk system according to claim 5 wherein said means for retaining includes a depression formed in one of said upper surface of said pedestal base or said lower surface of said pedestal desk support and a post formed on the other one of said upper surface of said pedestal base or said lower surface of said pedestal desk support, said post cooperating with said depression for retaining said lower surface of said pedestal desk support on said upper surface of said pedestal base.

8. The desk system according to claim 7 wherein said depression and said post each have an aperture formed therein, and including fastener means extending through said apertures for securely retaining said pedestal desk support on said pedestal base.

9. The desk system according to claim 3 including at least one finger extending from said floor engaging base for contacting a front corner of one of the seat risers.

10. The desk system according to claim 3 wherein said mounting means includes at least one adjusting screw extending from said floor engaging base for contacting one of the seat risers.

11. The desk system according to claim 3 wherein said mounting means includes at least one clamp attached to said floor engaging base for contacting a rear corner of one of the seat risers.

12. The desk system according to claim 3 wherein said floor engaging base has at least one aperture formed therein and including fastener means extending through said aperture for threadably engaging the vehicle floor.

13. The desk system according to claim 3 wherein said portable desk structure has a cellular telephone mounted on said means for mounting a cellular telephone.

14. The desk system according to claim 3 including a desk mounting means attached to said upper mounting surface, said desk mounting means including an upwardly extending wall formed about a periphery of said upper mounting surface of said pedestal means for retaining said lower surface of said portable desk structure on said upper mounting surface of said pedestal means.

15. The desk system according to claim 3 including a desk mounting means having one of a depression or a post formed in said upper mounting surface of said pedestal means and the other one of said depression or said post formed in said lower surface of said portable desk structure, said post and said depression cooperating to retain said portable desk structure on said upper mounting surface of said pedestal means.

16. The desk system according to claim 15 wherein said depression and said post each have an aperture formed therein, and including fastener means extending through said apertures for securely retaining said portable desk structure on said pedestal means.

17. The desk system according to claim 3 wherein said pedestal means is formed from a thermoformed plastic material.

* * * * *